(12) United States Patent
Matsushima (10) Patent No.: US 7,084,917 B2
(45) Date of Patent: Aug. 1, 2006

(54) IMAGE SENSING APPARATUS FOR CALCULATING A HISTOGRAM OF IMAGE DATA AND ITS CONTROL METHOD

(75) Inventor: Hiroshi Matsushima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 820 days.

(21) Appl. No.: 10/195,982

(22) Filed: Jul. 16, 2002

(65) Prior Publication Data

US 2003/0016299 A1    Jan. 23, 2003

(30) Foreign Application Priority Data

Jul. 18, 2001    (JP)    ............................. 2001-218667

(51) Int. Cl.
*H04N 5/222* (2006.01)
*H04N 5/235* (2006.01)

(52) U.S. Cl. ............................... 348/333.02; 348/229.1
(58) Field of Classification Search ........... 348/333.02, 348/229.1
See application file for complete search history.

(56) References Cited

U.S. PATENT DOCUMENTS

| 4,182,573 | A | * | 1/1980 | Yamada et al. ............. 356/218 |
| 4,671,655 | A | * | 6/1987 | Heard ......................... 356/227 |
| 5,874,988 | A | * | 2/1999 | Gu .............................. 348/97 |
| 2002/0171747 | A1 | * | 11/2002 | Niikawa et al. ....... 348/333.01 |

* cited by examiner

*Primary Examiner*—David Ometz
*Assistant Examiner*—James M. Hannett
(74) *Attorney, Agent, or Firm*—Morgan & Finnegan, L.L.P.

(57) ABSTRACT

This invention provides an image sensing apparatus and method, which can independently calculate and display the histograms of the entire range and selected range of image data sensed by an image sensing element.

In an image sensing apparatus of this invention, a microcomputer (16) calculates the histogram of the entire area of image data sensed by an image sensing element (6), and that of image data of an area selected by an operation member (18) which is used to select a photometry mode, and identifiably displays these calculation results on an EVF (12) via circuits from a video signal processing circuit (10) to an EVF driving circuit.

7 Claims, 9 Drawing Sheets

43
HISTOGRAM OF
ENTIRE IMAGE DATA

FIG. 4B

43
HISTOGRAM OF
ENTIRE IMAGE DATA 42
(HISTOGRAM WITHIN
PHOTOMETRY AREA) × α

FIG. 4C

43
HISTOGRAM OF
ENTIRE IMAGE DATA

44
HISTOGRAM WITHIN
PHOTOMETRY AREA

PHOTOMETRY MODE : SPOT PHOTOMETRY

FIG. 6B

PHOTOMETRY MODE : PARTIAL PHOTOMETRY

THREE-POINT RANGE VIEWFINDER

800 LEFT RANGING POINT

FIG. 8B

801 SELECTED RANGE WITHIN IN-FOCUS RANGING POINT MARK

FIG. 9

IMAGE SENSING APPARATUS FOR CALCULATING A HISTOGRAM OF IMAGE DATA AND ITS CONTROL METHOD

FIELD OF THE INVENTION

This invention relates to an apparatus such as an image processing apparatus, an image sensing apparatus, or the like, its control method, and an image sensing method and, more particularly, to an apparatus for calculating the histogram of image data and its control method.

BACKGROUND OF THE INVENTION

A conventional camera, which can display image data as a histogram, mainly displays entire image data as a histogram. In the histogram of the entire image data, luminance, R, G, and B data are independently calculated and displayed.

The displayed histogram of the entire image data in the aforementioned camera is used to fetch a largest possible number of kinds of information, e.g., a principal object within a narrow latitude.

However, the aforementioned camera that can display the histogram of the entire image data does not have a function of calculating the histogram of only a specific range of image data independently from that of the entire image data to obtain an appropriate exposure value, and a function of displaying the calculation result as a histogram.

SUMMARY OF THE INVENTION

It is an object of the present invention to provide an apparatus which can improve a histogram display function of image data, a histogram display method, a computer control program for histogram display, and a computer readable computer program product that stores a computer control program for histogram display.

In order to achieve the above object, according to one aspect of the present invention, there is provided an apparatus which calculates the histogram of image data of a partial region selected from an entire frame, and displays the calculation result of the histogram, a histogram display method, a computer control program for histogram display, and a computer readable computer program product that stores a computer control program for histogram display.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

An image processing apparatus which can calculate independent histograms of the entire and selected ranges of image data and its image processing method, and an image sensing apparatus which mounts that image processing apparatus, and can calculate and display independent histograms of the entire and selected ranges of image data sensed by an image sensing element, and its image sensing method, according to a preferred embodiment of the present invention, will be described below with reference to the accompanying drawings.

<First Embodiment>

This embodiment will explain an image sensing apparatus, which can display the histogram of the entire image data, can also calculate the histogram of image data corresponding to a photometry range of each photometry mode such as a partial photometry mode, spot photometry mode, or the like in a selected photometry mode, and can identifiably superimpose these histograms, and its image sensing method.

Figure 2:
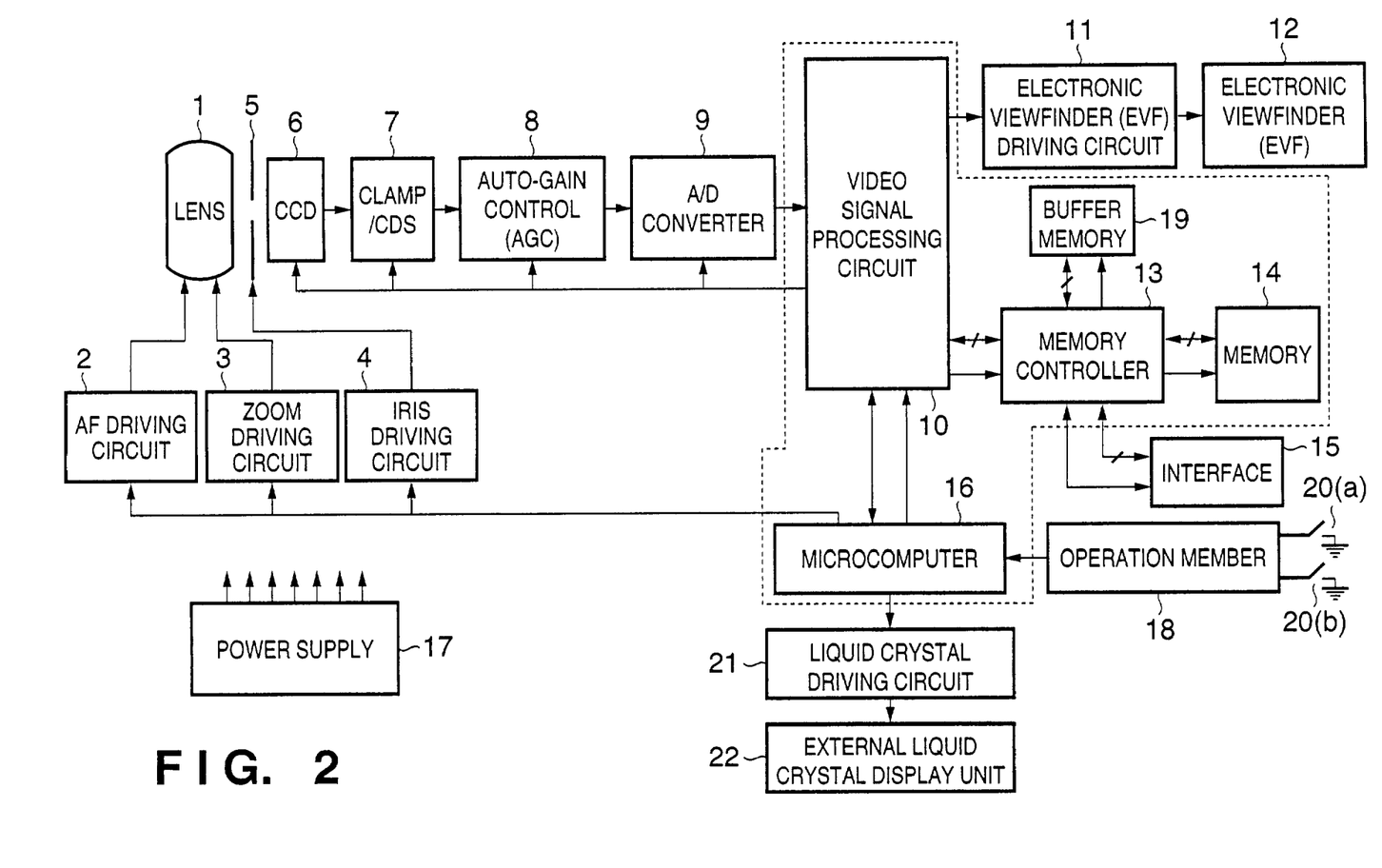
FIG. 2 is a block diagram showing the arrangement of an image sensing apparatus according to the present invention.

[Arrangement of Image Sensing Apparatus: FIG. 2]

FIG. 2 is a block diagram showing the arrangement of an image sensing apparatus which mounts an image processing apparatus according to an embodiment of the present invention.

Reference numeral 1 denotes a photographing lens. An auto-focus (AF) driving circuit 2 comprises, e.g., a stepping motor, and changes a focus lens position in the photographing lens 1 under the control of a microcomputer 16 to focus on an image sensing element 6.

A defocus amount used in a focus calculation is obtained by calculating a specific area of an output from a CCD as the image sensing element 6 using a video signal processing circuit 10. Also, a point determined to have a highest contrast or the nearest distance may be determined from a plurality of specific areas, and the focus lens position in the photographing lens 1 may be changed based on the defocus amount at that point to focus on the image sensing element 6.

A zoom driving circuit 3 drives, e.g., a stepping motor to change a zoom lens position in the photographing lens 1 under the control of the microcomputer 16, thus changing the focal length of the photographing lens 1.

An iris driving circuit 4 drives, e.g., an auto iris or the like to change an optical aperture value under the control of the microcomputer 16.

As the image sensing element 6, a CCD or the like is used, and photoelectrically converts an object image formed on the image sensing element by the optical photographing lens 1 and outputs it as an electrical signal.

A clamp/CDS circuit 7, and auto-gain control (AGC) 8 execute basic analog processes before A/D conversion. The microcomputer 16 can change the clamp level, and auto-gain control (AGC) reference level.

An A/D converter 9 converts an analog CCD output signal into a digital signal.

The video signal processing circuit 10 executes a filter process, color conversion process, and gamma/knee process of digital CCD image data, and outputs the processed data to a memory controller 13.

Also, the video signal processing circuit 10 incorporates a D/A converter, which converts image data input from the memory controller 13 into an analog signal, in addition to a video signal input from the CCD as the image sensing element 6, and can output that analog signal to an electronic viewfinder (EVF) monitor 12 via an electronic viewfinder (EVF) driving circuit 11.

These functions in the video processing circuit 10 are switched by exchanging data with the microcomputer 16, and the circuit 10 can output exposure information, focus information, white balance information, and auto-focus information of a CCD signal to the microcomputer 16 as needed.

The microcomputer 16 adjusts the white balance and gain on the basis of these kinds of information. Also, the microcomputer 16 evaluates focus information, and communicates with the AF driving circuit 2 to drive the focus lens.

Also, image data can be saved in a buffer memory 19 via the memory controller 13 without any process in accordance with an instruction from the microcomputer 16.

The video signal processing circuit 10 also has a compression function such as JPEG or the like.

When images are to be continuously shot, image data are temporarily stored in the buffer memory 19, unprocessed image data are read out via the memory controller 13 and undergo the basic processes or compression process by the video signal processing circuit 10 during a processing time, thus improving the continuous shot speed.

The number of images that can be continuously shot largely depends on the size of the buffer memory 19. The microcomputer 16 calculates the histogram of G components of an image signal via the video signal processing circuit 10, and sends that histogram information to the video signal processing circuit 10, which mixes the histogram information and sensed image data, converts the mixed image data into an analog signal, and outputs that analog signal to the EVF monitor 12 via the EVF driving circuit 11, thus displaying the histogram and sensed image on the electronic viewfinder (EVF).

The microcomputer 16 can independently calculate the histogram of a full frame and that within a selected photometry area on the basis of a photometry mode (partial photometry, spot photometry, average photometry, split photometry, or the like) set by an operation member 18.

Figure 6A:
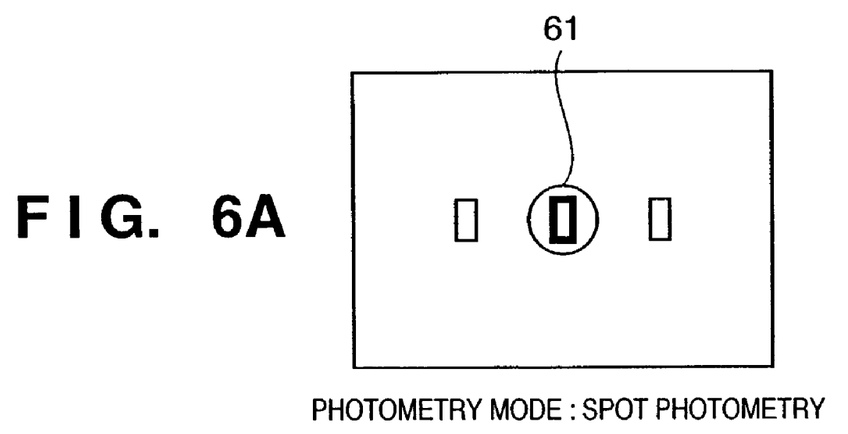
FIGS. 6A and 6B are views for explaining a spot photometry mode (FIG. 6A) and partial photometry mode (FIG. 6B) as an example of photometry modes in the first embodiment according to the present invention.
Figure 6B:
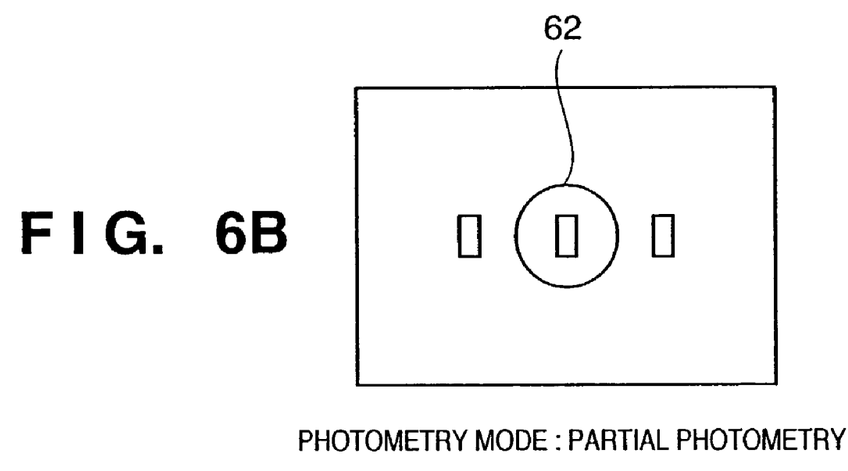

For example, FIG. 6A shows a spot photometry range 61 within a frame as an example of a spot photometry mode. Also, FIG. 6B shows an example of a partial photometry range 62 within a frame as an example of a partial photometry mode.

The memory controller 13 stores unprocessed digital image data input from the video signal processing circuit 10 in the buffer memory 19, stores processed digital image data in a memory 14, and outputs image data from the buffer memory 19 or memory 14 to the video signal processing circuit 10.

The memory controller 13 can also store video data sent via an external interface 15 and can output image data stored in the memory 14 via the external interface 15. The memory 14 can comprise a detachable memory.

A power supply 17 supplies required electric power to respective ICs and driving systems.

The operation member 18 detects the state of a histogram setup switch (not shown), and informs the microcomputer 16 of that detected state. The microcomputer 16 controls the aforementioned units in accordance with a change in operation member 18. In this embodiment, the histogram setup switch (not shown) is used to set a photometry mode and to turn on/off a histogram setup mode, and the operation member 18 detects the state of the histogram setup switch.

Reference numerals 20($a$) and 20($b$) denote release button switches, which are input switches of the operation member 18. When the release button switch 20($a$) alone is ON, this state corresponds to the half-stroke position of the release button; when both the release button switches 20($a$) and 20($b$) are ON, this state corresponds to the full-stroke position of the release button at which a sensed image is held and recorded.

Reference numeral 21 denotes a liquid crystal driving circuit for driving an external liquid crystal display unit 22 in accordance with a display content command from the microcomputer 16.

In the aforementioned arrangement, the video signal processing circuit 10, memory controller 13, memory 14, microcomputer 16, and buffer memory 19 may independently form an image processing unit.

Figure 3:
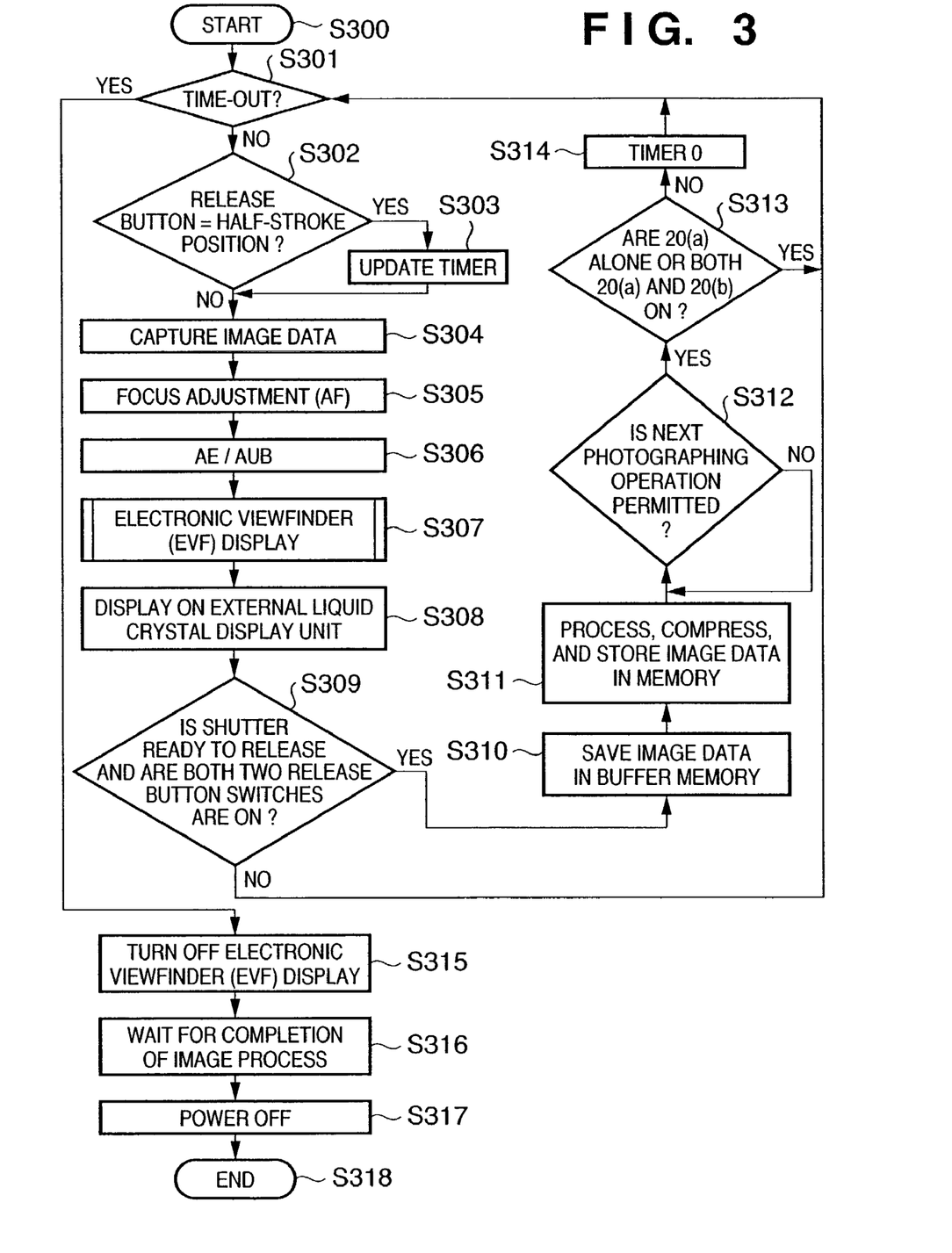
FIG. 3 is a flow chart for explaining the image sensing operation of the image sensing apparatus according to the present invention.

[Operation in Photographing Mode: FIG. 3]

The operation of the image sensing apparatus in a photographing mode used in this embodiment will be described below using the flow chart in FIG. 3.

The operation of the image sensing apparatus in the photographing mode starts in step S300.

It is checked in step S301 if a power OFF timer has reached a time-out. If YES in step S301, the flow jumps to step S315 to execute a power OFF process. On the other hand, if NO in step S301, the flow advances to step S302.

It is checked in step S302 if the release button 20 is at its half-stroke position. If YES in step S302, i.e., if the release button switch 20($a$) alone is ON, the flow advances to step S303 to update the timer, and the flow then advances to step S304.

On the other hand, if it is determined in step S302 that neither the release button switch 20(*a*) nor the release button switch 20(*b*) are pressed, the flow advances to step S304 without any process.

In step S304, image data of the CCD 6 is captured via the clamp/CDS circuit 7→ AGC 8→ A/D converter 9.

In step S305, the lens driving amount is calculated based on focus information as an output from the video signal processing circuit 10, and the focus lens in the lens 1 is driven using this lens driving amount via the AF driving circuit 2, thus attaining focus adjustment.

In step S306, a gain value to be sent to the AGC 8, an aperture value to be sent to the iris driving circuit 4, a digital shutter value used to control the CCD 6, and R and B gains used in the video signal processing circuit 10 are calculated and determined on the basis of the exposure condition and white balance information as outputs from the video signal processing circuit 10 so as to control these circuits to obtain an appropriate brightness and color. Note that a photometry value used to calculate the exposure condition is generated based on a luminance signal within a photometry area complying with a photometry mode, which is set by the operation member 18.

In step S307, a display image and histogram are calculated based on an image signal captured in step S304, and the calculation results are sent to the EVF driving circuit 11, which displays the image and histogram on the EVF 12. The histogram calculation process will be described later using the flow chart in FIG. 1.

In step S308, the photographing information determined in steps S305 and S306 is sent to the liquid crystal driving circuit 21, and is displayed on the external liquid crystal display unit 22.

It is checked in step S309 if the shutter is ready to release, and the release button switches 20(*a*) and 20(*b*) are simultaneously ON (release button is fully pressed). If YES in step S309, the flow advances to step S310 to execute a process for saving image data. However, if it is determined in step S309 that the shutter is ready to release but the release buttons 20(*a*) and 20(*b*) are not simultaneously ON (release button is not fully pressed), the flow returns to step S301 without any process.

In step S310, an image signal is sent to the memory controller 13, and image data is temporarily saved in the buffer memory 19.

In step S311, if the level of the load on the video signal processing circuit 10 is low enough to execute an image process, a process for processing and compressing unprocessed image data stored in the buffer memory 19, and storing the compressed data in the memory 14 is executed. In case of a continuous shot mode or the like, since image data are stored in turn in the buffer memory 19, the aforementioned image data process may be suspended.

It is checked in step S312 if the photographing operation of the next frame is permitted. If the buffer memory 19 has a free area, the photographing operation of the next frame is permitted, and the flow advances to step S313. On the other hand, if the buffer memory 19 has no free area, the photographing operation of the next frame is not permitted in step S312, and the control waits until the image data process, compression, and memory storage for one frame are completed.

It is checked in step S313 if the release button switch 20(*a*) alone or both the release button switches 20(*a*) and 20(*b*) are ON. If the release button switch 20(*a*) alone or both the release button switches 20(*a*) and 20(*b*) are not ON, the flow advances to step S314 to clear the power OFF timer.

That is, after the power OFF timer is forcibly set in a time-out state, the flow returns to step S301.

On the other hand, if it is determined in step S313 the release button switch 20(*a*) alone or both the release button switches 20(*a*) and 20(*b*) are ON, the flow returns to step S301 without any process.

In step S315, a power OFF process is executed. That is, the EVF driving circuit 11 turns off display of the EVF 12.

In step S316, the control waits until all the image data process, compression, and memory storage, which have started from step S311, are completed and the buffer memory 19 becomes empty.

In step S317, an instruction is issued to the power supply 17 to turn off an unnecessary power supply, and the flow then advances to step S318 to end a series of operations.

Figure 1:
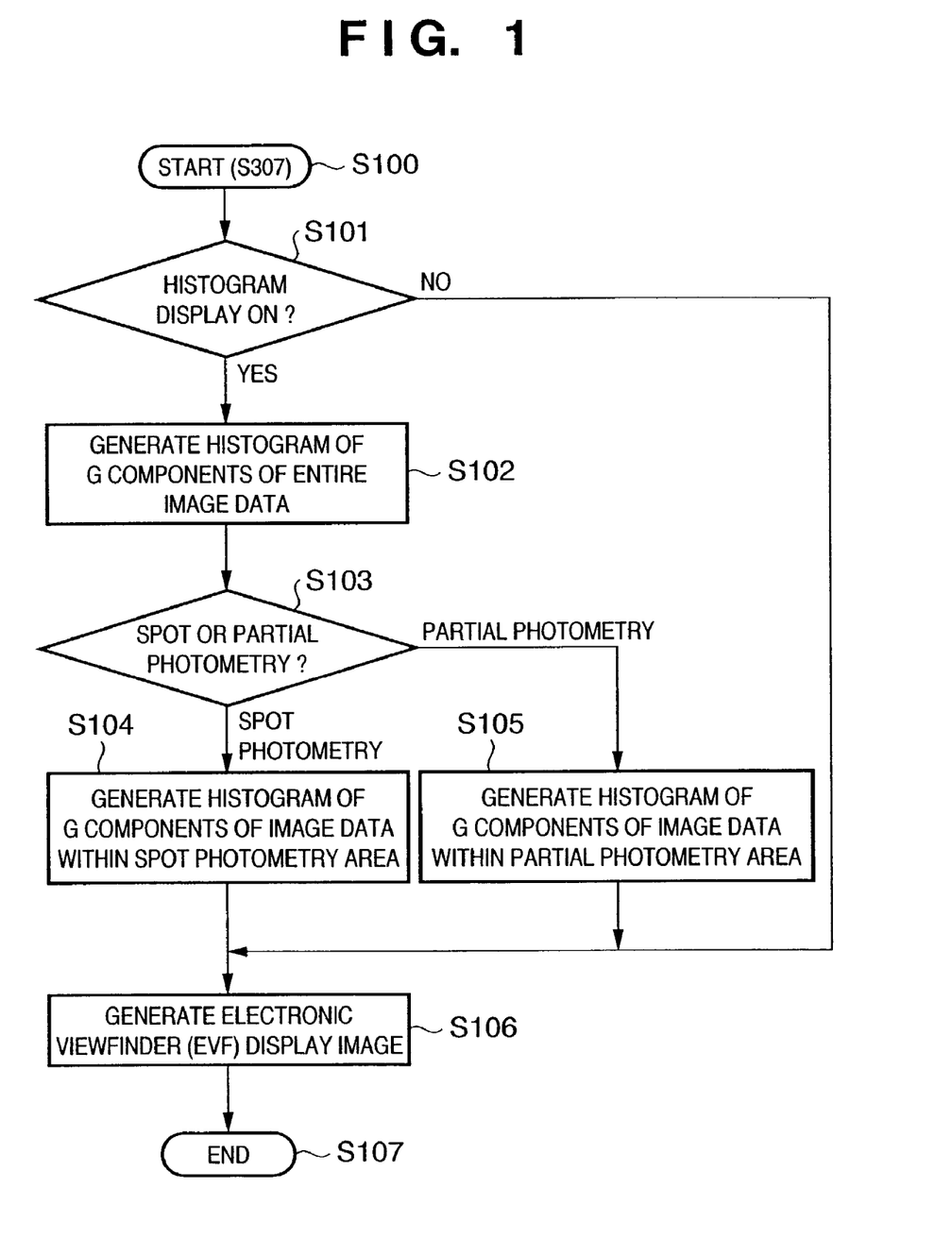
FIG. 1 is a flow chart for explaining a display method of the histogram of entire image data and that of a selection region by an image sensing apparatus according to the first embodiment of the present invention.

[Histogram Display on EVF: FIG. 1]

A characteristic feature of the first embodiment will be described below using the flow chart shown in FIG. 1.

The process shown in the flow chart in FIG. 1 is included in step S307 in FIG. 3.

In the following description, a method of displaying histograms on the electronic viewfinder using G components of the entire range of the image sensing frame of image data, and a partial range selected from the entire image sensing range of image data will be exemplified. However, the process to be described below is not limited to G components, and may use R or B components or luminance signal.

The process starts in step S100.

It is checked in step S101 based on the operation member 18 if the histogram display mode is ON or OFF. If the histogram display mode is OFF, the flow jumps to step S106 to display an image alone.

If it is determined in step S101 based on the operation member 18 that the histogram display mode is ON, the flow advances to step S102 to calculate a histogram on the basis of G components of entire image data.

The current photometry mode set by the operation member 18 is checked in step S103. If a spot photometry mode is set, the flow advances to step S104; if a partial photometry mode is set, the flow advances to step S105.

In step S104, a histogram is calculated using G components of image data corresponding to a spot area 61 shown in FIG. 6A, and the flow then advances to step S106.

On the other hand, in step S105 a histogram is calculated using G components of image data corresponding to a partial photometry area 62 shown in FIG. 6B, and the flow then advances to step S106.

In step S106, image data to be sent to the EVF driving circuit 11 is generated on the basis of the histogram of the entire image calculated in step S102, and that of image data within the selected photometry area calculated in step S104 or S105. As image data to be sent to the EVF driving circuit 11, a histogram may be superimposed on an image, or a small image and histogram may be displayed side by side.

In step S107, a series of operations end.

Figure 4A:
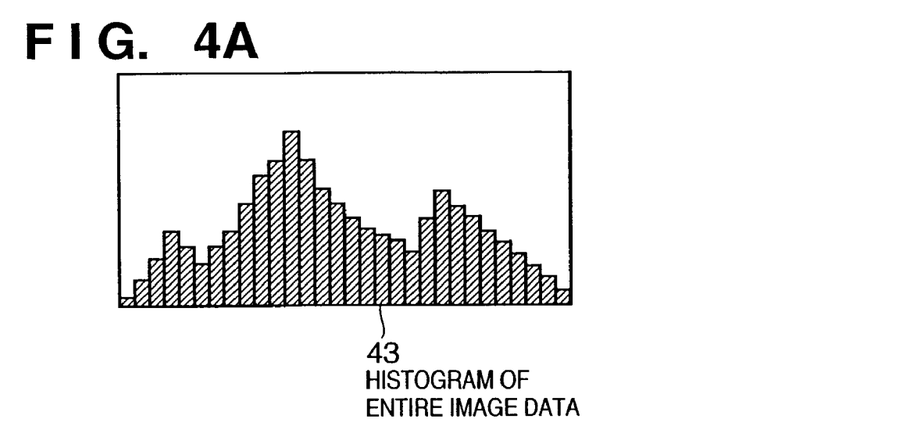
FIG. 4A shows an example in which the histogram of only the entire image data alone is displayed by the image sensing apparatus according to the present invention.
Figure 4B:
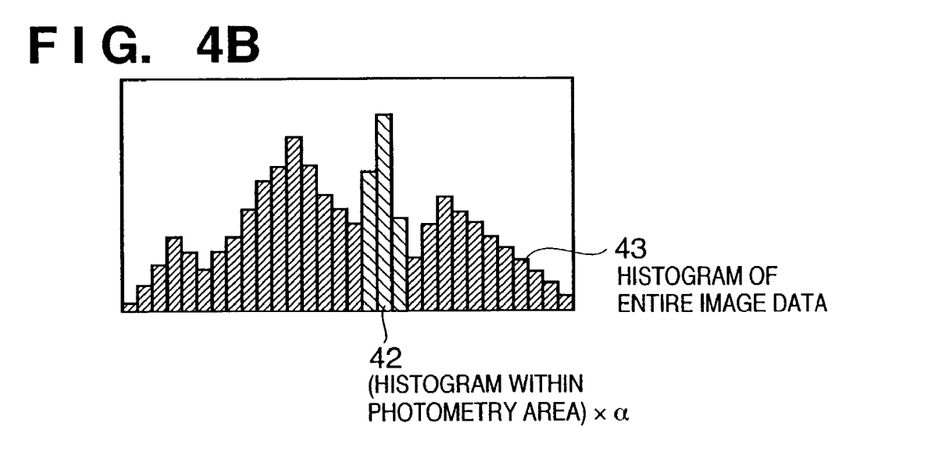
FIG. 4B shows an example in which the histogram of the entire image data (FIG. 4C), and that within the photometry area (FIG. 4C) that is multiplied by a given constant are superimposed simultaneously.
Figure 4C:
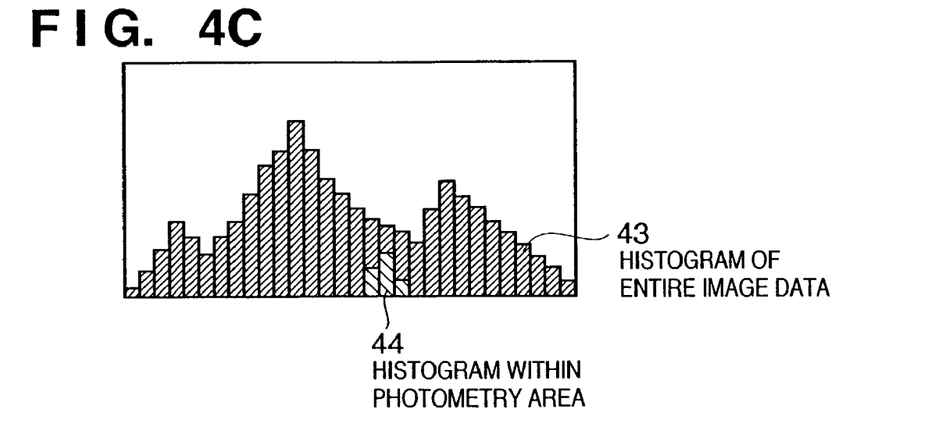
FIG. 4C shows an example in which the histogram of the entire image data and that within a photometry area are superimposed simultaneously.

[Example of Histogram Display: FIGS. 4A to 4C]

FIGS. 4A to 4C show examples of histogram display.

FIG. 4A shows a display example of a histogram 43 of the entire image data alone.

FIG. 4C shows an example in which the histogram 43 of the entire image data calculated in step S102 of the flow chart in FIG. 1, and a histogram 44 within the selected photometry area calculated in step S104 or S105 of the flow chart in FIG. 1 are simultaneously superimposed.

In FIG. 4C, the histogram 44 within the selected photometry area is narrower and smaller than the histogram 43 of the entire image data. As shown in FIG. 4C, when the histogram 44 within the selected photometry area may become smaller than the histogram 43 of the entire image data and may be hard to be observed, the histogram calculated in step S104 or S105 may be multiplied by a predetermined coefficient (e.g., α) to make the histogram easy to see, as shown in FIG. 4B.

FIG. 4B shows an example in which the histogram 43 of the entire image data calculated in step S102, and a histogram 42 within the photometry area as the product of the histogram 44 within the selected photometry area calculated in step S104 or S105, and a predetermined constant α (histogram 44×α) are superimposed.

Note that it is preferable to respectively display the histogram 43 of the entire image data and the histogram 42 within the selected photometry area using identifiable colors or patterns.

As described above, the image sensing apparatus of this embodiment has a function of calculating the histogram of a specific range (partial photometry area, spot photometry area, or the like) alone of image data independently of that of the entire image data, and displaying that calculation result so as to obtain an appropriate exposure value. For this reason, whether or not a principal object can undergo appropriate exposure can be easily determined using histogram display shown in, e.g., FIG. 4B, and a principal object can undergo appropriate exposure upon photographing.

<Second Embodiment>

In the first embodiment, the image sensing apparatus which can calculate the histogram of image data corresponding to a given photometry range when the selected photometry mode is, e.g., a partial or spot photometry mode, in addition to the histogram of the entire image data, and can identifiably superimpose both the histograms of the entire image data and the selected range, and its image sensing method have been explained.

On the other hand, in the second embodiment to be described below, an image sensing apparatus which can calculate the histogram of image data corresponding to a given photometry range when the selected photometry mode is other than the partial or spot photometry mode, i.e., an average or split photometry mode, and the photometry area is broad or indefinite, and can identifiably superimpose both the histograms of the entire image sensing range of image data, and a partial range selected from the entire image sensing range, and its image sensing method will be explained.

[Arrangement of Image Sensing Apparatus: FIG. 2]

Note that the arrangement of the image sensing apparatus that mounts an image processing apparatus of the second embodiment is the same as that of the first embodiment, which has been explained using FIG. 2. Therefore, since the block diagram that shows the arrangement of an image sensing apparatus which mounts an image processing apparatus of the second embodiment and its description are redundant, a description thereof will be omitted.

[Operation in Photographing Mode: FIG. 3]

The operation of the image sensing apparatus in the photographing mode used in the second embodiment will be described below.

The basic operation of the image sensing apparatus in the photographing mode used in the second embodiment is substantially the same as that in the first embodiment that has been explained using FIG. 3, except for the process in step S307 in FIG. 3.

Figure 5:
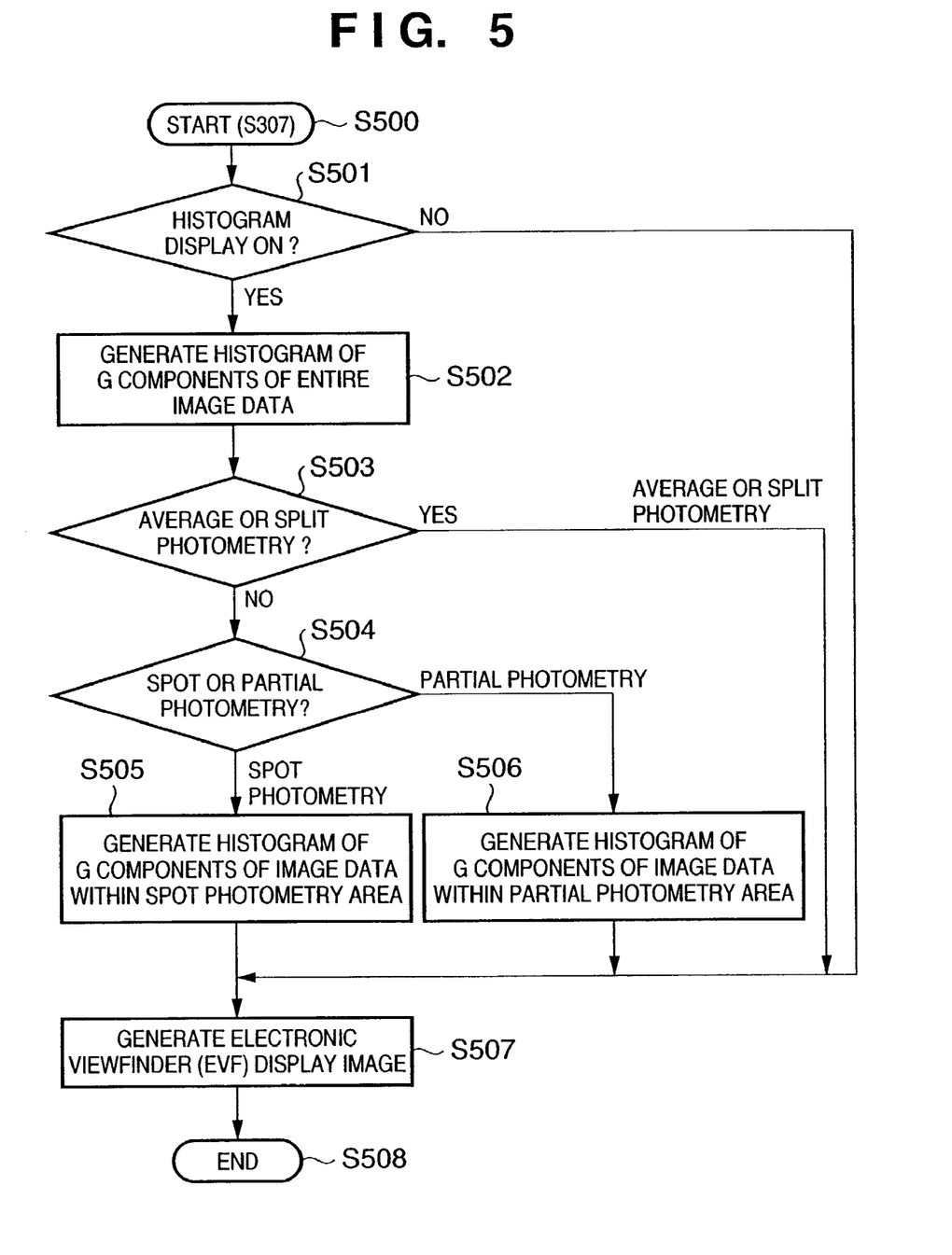
FIG. 5 is a flow chart for explaining a display method of the histogram of the entire image data and that of a selected region by an image sensing apparatus according to the second embodiment of the present invention.

In the following description of the second embodiment, a repetitive description of FIG. 3 will be avoided, and only a characteristic feature of the second embodiment, which is different from the first embodiment, will be explained using FIG. 5. In the following description, a method of displaying histograms on the electronic viewfinder using G components of the entire range of the image sensing frame of image data, and a partial range selected from the entire image sensing range of image data will be exemplified. However, the process to be described below is not limited to G components, may use R or B components or luminance signal.

[Histogram Display on EVF: FIG. 5]

The operation in the photographing mode starts in step S500.

It is checked in step S501 based on the operation member 18 if the histogram display mode is ON or OFF. If the histogram display mode is OFF, the flow jumps to step S507 to display an image alone.

If it is determined in step S501 based on the operation member 18 that the histogram display mode is ON, the flow advances to step S502 to calculate a histogram on the basis of G components of entire image data.

The current photometry mode set by the operation member 18 is checked in step S503. If an average or split photometry mode is set, the flow jumps to step S507 without any process; if the spot or partial photometry mode is set, the flow advances to step S504.

The current photometry mode set by the operation member 18 is checked in step S504. If a spot photometry mode is set, the flow advances to step S505; if a partial photometry mode is set, the flow advances to step S506.

In step S505, a histogram is calculated using G components of image data corresponding to a spot area 61 shown in FIG. 6A, and the flow then advances to step S507.

On the other hand, in step S506 a histogram is calculated using G components of image data corresponding to a partial photometry area 62 shown in FIG. 6B, and the flow then advances to step S507.

In step S507, image data to be sent to the EVF driving circuit 11 is generated on the basis of the histogram of the entire image calculated in step S502, and that of image data within the selected photometry area calculated in step S505 or S506. As image data to be sent to the EVF driving circuit 11, a histogram may be superimposed on an image, or a small image and histogram may be displayed side by side.

In step S508, a series of operations end.

As described above, the image sensing apparatus of the second embodiment has a function of inhibiting display of the histogram of image data within a specific range when the relationship between the photometry area and principal object is ambiguous, in addition to the function of the image sensing apparatus of the first embodiment.

That is, the image sensing apparatus of the second embodiment has a function of displaying the histograms of the selected range and entire image data, as has been proposed in the first embodiment, and also a function of displaying only the histogram of the entire image data and inhibiting display of the histogram of image data within a specific range when a photometry area for which it is nonsense to display the histogram of only a specific range of image data photometry area is selected.

For this reason, only when a spot or partial photometry area is selected, whether or not a principal object can undergo appropriate exposure can be easily determined by displaying two different histograms, as shown in, e.g., FIG. 4B, and a principal object can undergo appropriate exposure upon photographing.

<Third Embodiment>

In the first embodiment, the image sensing apparatus which can calculate the histogram of image data corresponding to a given photometry range when the selected photometry mode is, e.g., a partial or spot photometry mode, in addition to the histogram of the entire image data, and can identifiably superimpose both the histograms of the entire image data and the selected range, and its image sensing method have been explained.

On the other hand, in the third embodiment to be described below, the selected photometry mode corresponds to a selected range within an in-focus ranging point mark (e.g., a point determined to have a highest contrast or the nearest distance from a plurality of specific areas) controlled by, e.g., the AF driving circuit 2, video signal processing circuit 10, and microcomputer 16.

In case of the third embodiment, an image sensing apparatus which can calculate the histogram of image data corresponding to the selected range within the in-focus ranging point mark, and can identifiably superimpose it on the histogram of the entire image data, and its image sensing method will be explained.

[Arrangement of Image Sensing Apparatus: FIG. 2]

Note that the arrangement of the image sensing apparatus that mounts an image processing apparatus of the third embodiment is the same as that of the first embodiment, which has been explained using FIG. 2. Therefore, since the block diagram that shows the arrangement of an image sensing apparatus which mounts an image processing apparatus of the third embodiment and its description are redundant, a detailed description thereof will be omitted.

[Operation in Photographing Mode: FIG. 3]

The operation of the image sensing apparatus in the photographing mode used in the third embodiment will be described below.

The basic operation of the image sensing apparatus in the photographing mode used in the third embodiment is substantially the same as that of the first embodiment described using FIG. 3, except for the process in step S307 in FIG. 3.

In the following description of the third embodiment, only the process in step S307 in FIG. 3 will be explained, and a description of other steps will be omitted since it is redundant. Also, a characteristic feature of the third embodiment, which is different from the first embodiment, will be explained using FIG. 7.

The operation of the image sensing apparatus in the photographing mode used in the third embodiment will be described below using the flow chart in FIG. 3.

The operations from the beginning of the operation in the photographing mode in step S300 until the operation for capturing image data from the CCD 6 via the clamp/CDS circuit 7→ AGC 8→ A/D converter 9 in step S304 are the same as those described in the first embodiment, and a repetitive description thereof will be avoided.

In step S305, the lens driving amount is calculated and determined based on focus information as an output from the video signal processing circuit 10, and the focus lens in the lens 1 is driven using this lens driving amount via the AF driving circuit 2, thus attaining focus adjustment.

A point where focus adjustment is to be made is determined from a plurality of specific areas by determining a point determined to have the highest contrast or nearest distance.

In step S306, a gain value to be sent to the AGC 8, an aperture value to be sent to the iris driving circuit 4, a digital shutter value used to control the CCD 6, and R and B gains used in the video signal processing circuit 10 are calculated and determined on the basis of the exposure condition and white balance information as outputs from the video signal processing circuit 10 so as to control these circuits to obtain an appropriate brightness and color.

In step S307, a display image and histogram are calculated based on an image signal captured in step S304, and the calculation results are sent to the EVF driving circuit 11, which displays the image and histogram on the EVF 12. The histogram calculation process will be described later using the flow chart in FIG. 7.

Note that the subsequent operations from steps S308 to S318 are the same as those in the first embodiment, and a repetitive description thereof will be avoided.

Figure 7:
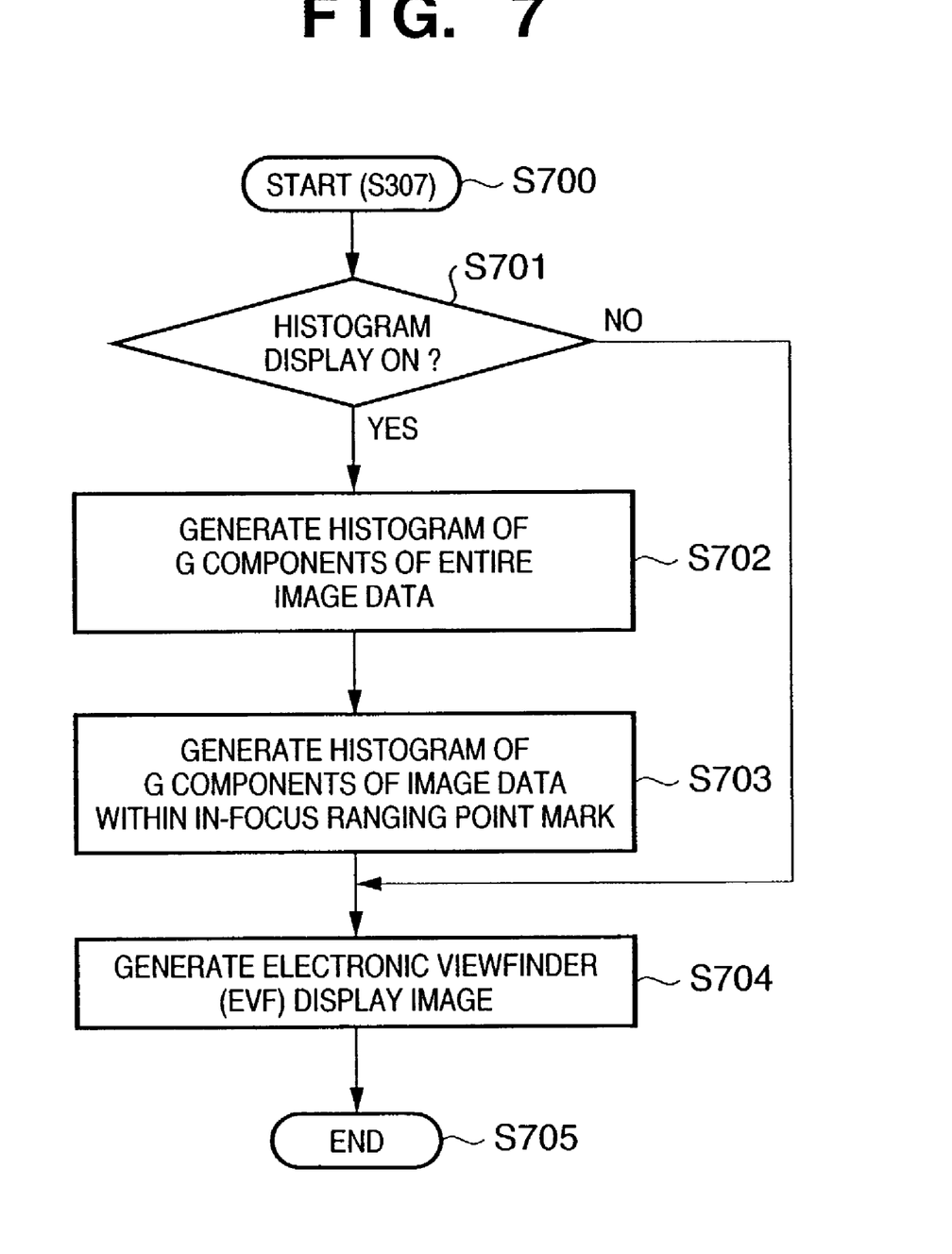
FIG. 7 is a flow chart for explaining a display method of the histogram of the entire image data and that of a selected region by an image sensing apparatus according to the third embodiment of the present invention.

In the following description, a method of displaying the histograms on the electronic viewfinder using G components of the entire range of the image sensing frame of image data, and a partial range selected from the entire image sensing range of image data will be exemplified. However, the process to be described below is not limited to G components, and may use R or B components or luminance signal.

[Histogram Display on EVF: FIG. 7]

A characteristic feature of the third embodiment will be described below using the flow chart shown in FIG. 7.

The process shown in the flow chart in FIG. 7 is included in step S307 in FIG. 3.

The process starts in step S700.

It is checked in step S701 based on the operation member 18 if the histogram display mode is ON or OFF. If the histogram display mode is OFF, the flow jumps to step S704 to display an image alone.

If it is determined in step S701 based on the operation member 18 that the histogram display mode is ON, the flow advances to step S702 to calculate a histogram on the basis of G components of entire image data.

Figure 8A:
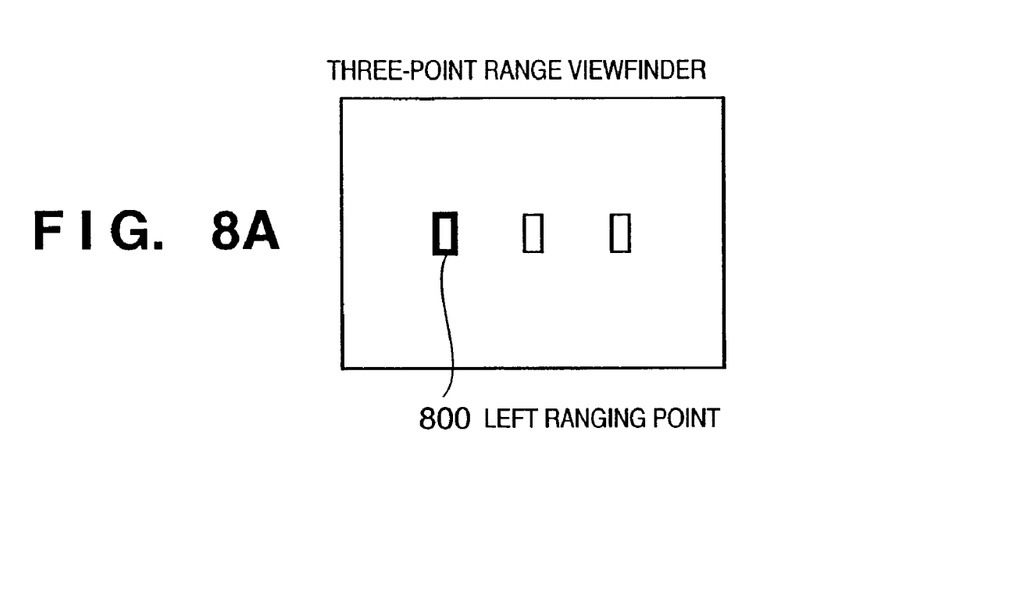
FIGS. 8A and 8B are views for explaining an example of a selected range within an in-focus ranging point mark as a photometry mode in the third or fourth embodiment according to the present invention.

In step S703, a histogram is calculated using G components of image data corresponding to the focal point range which is determined in step S305 in FIG. 3 and in which focus adjustment is to be made. FIG. 8A shows an example of three-point ranging. When a left ranging point corresponds to a focal point, a histogram is calculated using G components of image data within an area 800.

In step S704, image data to be sent to the EVF driving circuit 11 is generated on the basis of the histogram of the entire image calculated in step S702, and that of image data within the focal point area calculated in step S703.

As image data to be sent to the EVF driving circuit 11, a histogram may be superimposed on an image, or a small image and histogram may be displayed side by side.

In step S705, a series of operations end.

As described above, since the image sensing apparatus of the third embodiment has a function of displaying the histograms of the selected focal point area range and the entire image data, whether or not a principal object can undergo appropriate exposure can be easily determined by displaying two different histograms, as shown in, e.g., FIG. 4B, and a principal object can undergo appropriate exposure upon photographing.

<Fourth Embodiment>

In the fourth embodiment, an image sensing apparatus that can calculate the histogram of a specific range area around a focal point, which is determined in advance, in addition to the histogram of the entire image data, and can identifiably superimpose the two histograms of the entire image data and the selected range, and its image sensing method will be explained.

[Arrangement of Image Sensing Apparatus: FIG. 2]

Note that the arrangement of the image sensing apparatus that mounts an image processing apparatus of the fourth embodiment is the same as that of the third embodiment, which has been explained using FIG. 2. Therefore, since the block diagram that shows the arrangement of an image sensing apparatus which mounts an image processing apparatus of the fourth embodiment and its description are redundant, a detailed description thereof will be omitted.

[Operation in Photographing Mode: FIG. 3]

The operation of the image sensing apparatus in the photographing mode used in the fourth embodiment will be described below.

The basic operation of the image sensing apparatus used in the fourth embodiment is substantially the same as that in the third embodiment that has been explained using FIG. 3, except for the process in step S307 in FIG. 3.

In the following description of the fourth embodiment, a repetitive description of FIG. 3 will be avoided, and only a characteristic feature of the fourth embodiment, which is different from the third embodiment, will be explained using FIG. 9.

In the following description, a method of displaying histograms on the electronic viewfinder using G components of the entire range of the image sensing frame of image data, and a partial range selected from the entire image sensing range of image data will be exemplified. However, the process to be described below is not limited to G components, and may use R or B components or luminance signal.

[Histogram Display on EVF: FIG. 9]

A characteristic feature of the third embodiment will be described below using the flow chart shown in FIG. 9.

Figure 9:
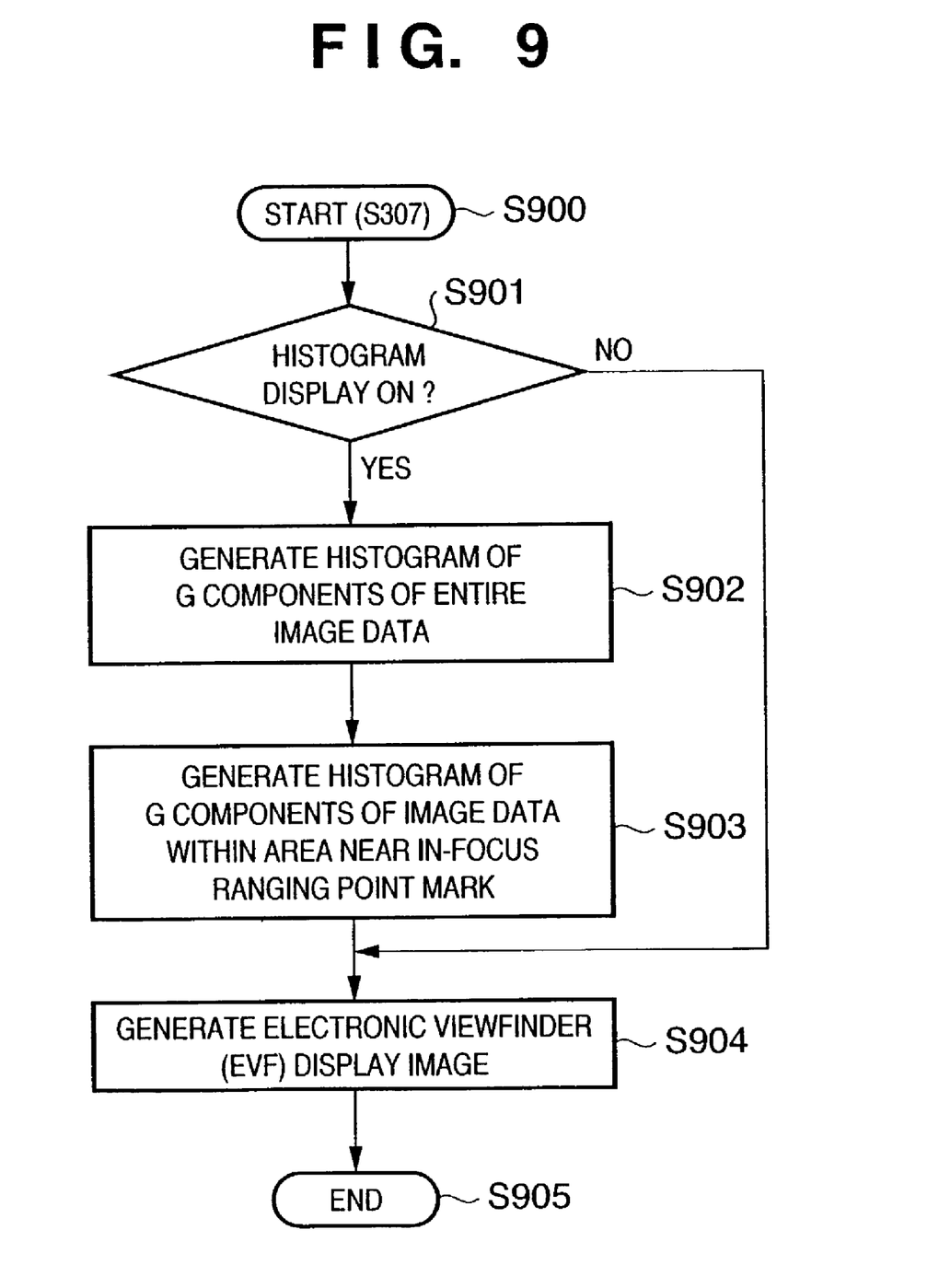
FIG. 9 is a flow chart for explaining a display method of the histogram of the entire image data and that of a selected region by an image sensing apparatus according to the fourth embodiment of the present invention.

The process shown in the flow chart in FIG. 9 is included in step S307 in FIG. 3.

The process starts in step S900.

It is checked in step S901 based on the operation member 18 if the histogram display mode is ON or OFF. If the histogram display mode is OFF, the flow jumps to step S904 to display an image alone.

If it is determined in step S901 based on the operation member 18 that the histogram display mode is ON, the flow advances to step S902 to calculate a histogram on the basis of G components of entire image data.

In step S903, a histogram is calculated using G components of image data corresponding to the focal point range which is determined in step S305 in FIG. 3 and in which focus adjustment is to be made.

Figure 8B:
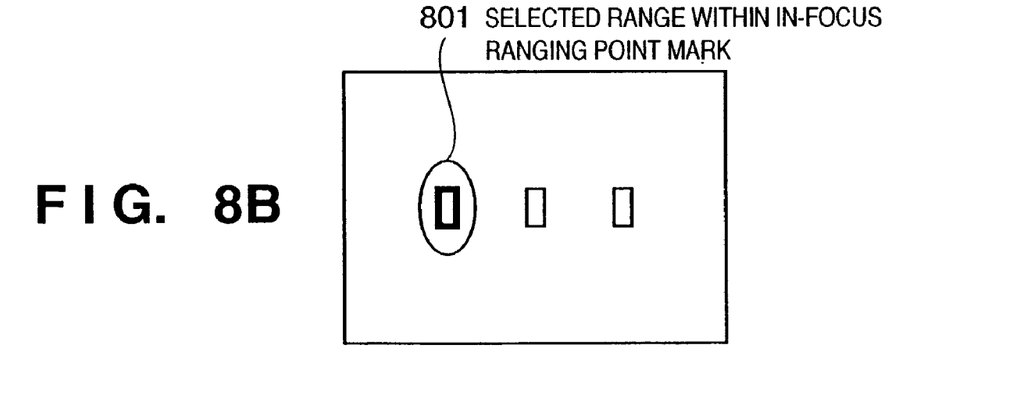

FIG. 8A shows an example of three-point ranging. When a left ranging point corresponds to a focal point, a histogram is calculated using G components of image data within a specific range area 801 around the left focal point, which is determined in advance, as shown in FIG. 8B.

In step S904, image data to be sent to the EVF driving circuit 11 is generated on the basis of the histogram of the entire image calculated in step S902, and that of image data within the focal point area calculated in step S903.

As image data to be sent to the EVF driving circuit 11, a histogram may be superimposed on an image, or a small image and histogram may be displayed side by side.

In step S905, a series of operations end.

As described above, with the image sensing apparatus of the fourth embodiment, the location of the brightness level of an image around the selected focal point with respect to the brightness level of the entire image can be easily determined since two different histograms are displayed, and the photographer can easily determine whether or not an object which is to undergo appropriate exposure actually undergoes appropriate exposure, thus effectively helping to determine an exposure correction amount.

As described above, in the conventional image sensing apparatus, histogram display of the entire image data is useful in a digital still image sensing apparatus in which an image sensing element has a narrow latitude since it can be used in place of an exposure meter, and is adopted in many image sensing apparatuses. However, histogram display is used to fetch a largest possible number of kinds of information within a narrow latitude, but is not used to obtain an appropriate exposure value of a principal object.

Hence, with the image sensing apparatus of the first embodiment, whether or not a principal object can undergo appropriate exposure can be easily determined using histogram display of this embodiment, and a principal object can undergo appropriate exposure upon photographing.

Or with the image sensing apparatus of the second embodiment, when the relationship between the photometry area and principal object is ambiguous, i.e., when the histogram display proposed in the first embodiment is not effective, only the histogram of the entire image data can be displayed, thus avoiding insignificant histogram display.

[Another Embodiment]

Note that the present invention may be applied to either a system constituted by a plurality of devices (e.g., a host computer, interface device, reader, printer, and the like), or an apparatus consisting of a single equipment (e.g., a copying machine, facsimile apparatus, or the like).

The objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the storage medium is written in a memory of the extension card or unit.

When the present invention is applied to the storage medium, that storage medium stores program codes corresponding to the aforementioned flow charts (FIGS. 1, 3, 5, and 7).

As described above, the present invention can provide an apparatus which can improve histogram display of image data, a histogram display method, a computer control program for histogram display, and a computer readable computer program product that stores a computer control program for histogram display.

As many apparently widely different embodiments of the present invention can be made without departing from the spirit and scope thereof, it is to be understood that the invention is not limited to the specific embodiments thereof except as defined in the claims.

What is claimed is:

1. An apparatus comprising:
   (A) a histogram calculation device that calculates a histogram of image data within a partial region selected from an entire frame; and
   (B) a display device that displays a calculation result of said calculation device, wherein said calculation device also calculates a histogram of image data of the entire frame, and
   said display device identifiably superimposes the calculation result of the histogram of the image data of the entire frame, and the calculation result of the histogram of the image data within the selected partial area, which are calculated by said calculation device.

2. The apparatus according to claim 1, wherein said display device identifiably displays the calculation result of the histogram of the image data of the entire frame, and the calculation result of the histogram of the image data within the selected partial area using different colors.

3. The apparatus according to claim 1, wherein said display device identifiably displays the calculation result of the histogram of the image data of the entire frame, and the calculation result of the histogram of the image data within the selected partial area using different patterns.

4. The apparatus according to claim 1, wherein said display device displays the calculation result of the histogram of the image data within the selected partial area to be emphasized with respect to the calculation result of the histogram of the image data of the entire frame.

5. A histogram display method comprising the steps of:
   calculating a histogram of image data within a partial region selected from an entire frame, and
   displaying the calculation result of the histograms,
   wherein in said calculating step, a histogram of image data of the entire frame is also calculated, and
   in said displaying step, the calculation result of the histogram of the image data of the entire frame, and the calculation result of the histogram of the image data within the selected partial area, which are calculated in said calculating step, are identifiably superimposed.

6. A computer control program for histogram display, comprising the steps of:
   calculating a histogram of image data within a partial region selected from an entire frame, and
   displaying the calculation result of the histogram,
   wherein in said calculating step, a histogram of image data of the entire frame is also calculated, and
   in said displaying step, the calculation result of the histogram of the image data of the entire frame, and the calculation result of the histogram of the image data within the selected partial area, which are calculated in said calculating step are identifiably superimposed.

7. A computer readable computer program product that stores computer control program for histogram display, comprising the steps of:
   calculating a histogram of image data within a partial region selected from an entire frame, and
   displaying the calculation result of the histograms,
   wherein in said calculating step, a histogram of image data of the entire frame is also calculated, and
   in said displaying step, the calculation result of the histogram of the image data of the entire frame, and the calculation result of the histogram of the image data within the selected partial area, which are calculated in said calculating step, are identifiably superimposed.

* * * * *